(12) United States Patent
Takeda et al.

(10) Patent No.: US 9,690,797 B2
(45) Date of Patent: Jun. 27, 2017

(54) DIGITAL INFORMATION ANALYSIS SYSTEM, DIGITAL INFORMATION ANALYSIS METHOD, AND DIGITAL INFORMATION ANALYSIS PROGRAM

(71) Applicant: UBIC, Inc., Minato-ku (JP)

(72) Inventors: Hideki Takeda, Minato-ku (JP);
Kazumi Hasuko, Minato-ku (JP);
Jakob Halskov, Koege (DK)

(73) Assignee: UBIC, INC, Tokyo (JP)

( * ) Notice: Subject to any disclaimer, the term of this patent is extended or adjusted under 35 U.S.C. 154(b) by 305 days.

(21) Appl. No.: 14/394,224

(22) PCT Filed: Mar. 17, 2014

(86) PCT No.: PCT/JP2014/057101
§ 371 (c)(1),
(2) Date: Oct. 13, 2014

(87) PCT Pub. No.: WO2014/203573
PCT Pub. Date: Dec. 24, 2014

(65) Prior Publication Data
US 2015/0293932 A1  Oct. 15, 2015

(30) Foreign Application Priority Data
Jun. 21, 2013  (JP) .................................. 2013-130766

(51) Int. Cl.
*G06F 7/00* (2006.01)
*G06F 17/30* (2006.01)
*G06F 17/27* (2006.01)

(52) U.S. Cl.
CPC .. *G06F 17/30106* (2013.01); *G06F 17/30011* (2013.01); *G06F 17/30657* (2013.01); *G06F 17/27* (2013.01)

(58) Field of Classification Search
None
See application file for complete search history.

(56) References Cited

U.S. PATENT DOCUMENTS

2006/0282415 A1* 12/2006 Shibata ............. G06F 17/30011
2007/0288458 A1* 12/2007 Kacmarcik ........... G06F 17/274
(Continued)

FOREIGN PATENT DOCUMENTS

| JP | 2004-021763 | 1/2004 |
| JP | 2012-043286 | 3/2012 |

(Continued)

OTHER PUBLICATIONS

Office Action issued Oct. 13, 2015 in Japanese Patent Application No. 2014-249088 (with English language translation).
(Continued)

*Primary Examiner* — Tuan A Pham
(74) *Attorney, Agent, or Firm* — Baker & Hostetler LLP

(57) ABSTRACT

A digital information analysis system includes a target selection unit that selects target digital information, a combination storage unit that stores each of a plurality of word combinations related to a predetermined specific item, a search unit that searches whether the plurality of word combinations stored in the combination storage unit are included in the target digital information selected by the target selection unit, a relation determination unit that determines the relation of the target digital information to the predetermined specific item on the basis of a morphological analysis result when the plurality of word combinations stored in the combination storage unit are included in the target digital information, and a determination result setting unit that associates the determination result of the relation determination unit with the target digital information.

8 Claims, 3 Drawing Sheets

(56) References Cited

U.S. PATENT DOCUMENTS

| | | | |
|---|---|---|---|
| 2011/0184935 A1* | 7/2011 | Marlin | G06Q 50/10 707/719 |
| 2012/0109969 A1* | 5/2012 | Gil | G06F 17/30864 707/741 |
| 2012/0109977 A1* | 5/2012 | Balinsky | G06F 17/30675 707/750 |
| 2012/0290578 A1* | 11/2012 | Morimoto | G06F 17/30669 707/737 |
| 2013/0013603 A1* | 1/2013 | Parker | G06F 17/3071 707/737 |
| 2013/0305149 A1* | 11/2013 | Dimitrov | G06F 17/30011 715/273 |

FOREIGN PATENT DOCUMENTS

| | | | | |
|---|---|---|---|---|
| JP | 2012-181851 | 9/2012 | | |
| TW | 201145050 A1 | 12/2011 | | |
| TW | 201224789 A1 | 6/2012 | | |
| WO | WO 2012014918 A1 * | 2/2012 | | G06F 17/3061 |

OTHER PUBLICATIONS

Kenji Nakamura, et al., "Method of Filtering Harmful Information Considering Extraction Range of Words Co-occurrence" Information Processing Society of Japan (IPSJ) Journal, vol. 54, No. 2, Feb. 15, 2013, 22 Pages (with English language translation).

Combined Office Action and Search Report issued Sep. 25, 2015 in Taiwanese Patent Application No. 103120440 (with English language translation).

Takeda, T. et al., "Examination of harmful information filtering taking into consideration co-occurrence distance", Collected papers of the $75^{th}$, National convention lectures (2), Artificial Intelligence and Cognitive Science, pp. 2-143-2-144, Mar. 6, 2013.

* cited by examiner

| WORD 1 | WORD 2 | SCORE |
|---|---|---|
| DIGITAL CAMERA | INFRINGEMENT | 5 |
| DIGITAL CAMERA | MANUFACTURE | 3 |
| PRODUCT | CORRESPONDENCE | 2 |
| RAPID RACE | SCHEDULE | 1 |

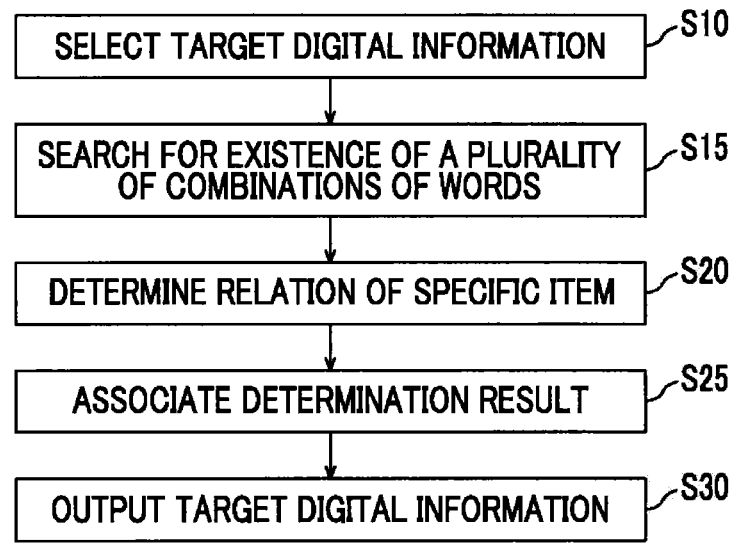
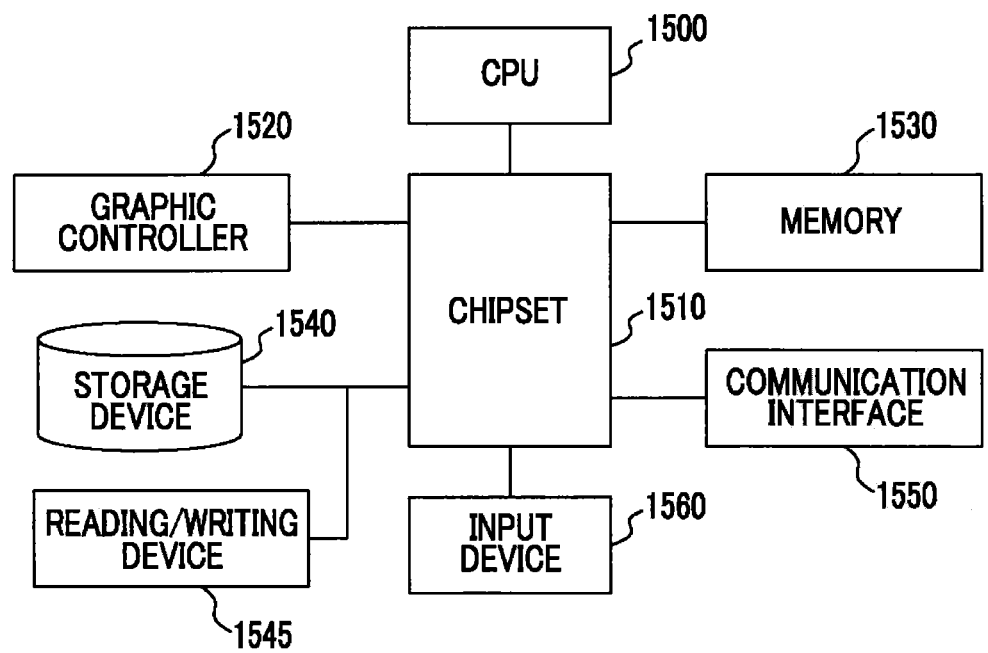

DIGITAL INFORMATION ANALYSIS SYSTEM, DIGITAL INFORMATION ANALYSIS METHOD, AND DIGITAL INFORMATION ANALYSIS PROGRAM

BACKGROUND OF THE INVENTION

Field of the Invention

The present invention relates to a digital information analysis system, a digital information analysis method, and a digital information analysis program. In particular, the invention relates to a digital information analysis system, a digital information analysis method, and a digital information analysis program that analyze digital information on the basis of relations between a plurality of words included in the digital information.

Background Art

A system which displays recorded digital information, sets user specification information indicating the relation between a plurality of document files and the users included in the user information, records the set user specification information in a storage unit, designates at least one or more users, searches for document files to which the user specification information corresponding to the designated users is set, sets additional information indicating whether the searched document files are related to a lawsuit through a display unit, and outputs the document files related to the lawsuit on the basis of the additional information has been conventionally known (for example, see Japanese Unexamined Patent Application Publication No. 2012-181851). According to the system disclosed in Japanese Unexamined Patent Application Publication No. 2012-181851, it is possible to extract only digital document information related to a specific person and to reduce the workload of an operation for gathering documentary evidence for the lawsuit.

The system disclosed in Japanese Unexamined Patent Application Publication No. 2012-181851 selects co-occurring morphemes on the basis of a plurality of words as well as a single word. Therefore, it is considered that the system can further reduce the operation workload.

SUMMARY OF THE INVENTION

An object of the invention is to provide a digital information analysis system, a digital information analysis method, and a digital information analysis program that analyze digital information on the basis of relations between a plurality of words.

In order to achieve the objective, one aspect of the invention is the provision of a digital information analysis system including a target selection unit that selects target digital information to be investigated which is stored in an information processing apparatus, a combination storage unit that stores each of a plurality of combinations of words related to a predetermined specific item, a search unit that searches whether the plurality of combinations of words stored in the combination storage unit is included in the target digital information selected by the target selection unit, a relation determination unit that determines the relation of the target digital information to the predetermined specific item on the basis of a morphological analysis result when at least one of the plurality of combinations of words stored in the combination storage unit is included in the target digital information, and a determination result setting unit that associates the determination result of the relation determination unit with the target digital information.

The digital information analysis system according to the above-mentioned aspect may further include an output unit that outputs the target digital information related to the predetermined specific information, on the basis of the determination result which is associated with each of a plurality of target digital information by the determination result setting unit.

In the digital information analysis system according to the above-mentioned aspect, the target selection unit may select a plurality of target digital information from the information processing apparatus. The search unit may search whether the plurality of word combinations is included in each of the plurality of target digital information. The relation determination unit may determine the relation between the plurality of words in each word combination. The determination result setting unit may associate the determination result with each of the plurality of target digital information.

In the digital information analysis system according to the above-mentioned aspect, the relation determination unit may include an analysis unit that performs morphological analysis on the target digital information, a positional information giving unit that gives positional information in a sentence contained in the target digital information to each component word forming the word combination, on the basis of the analysis result of the analysis unit, a distance calculation unit that calculates the distance between two pieces of positional information given by the positional information giving unit to each component word of each word combination, and a determination unit that determines the relation on the basis of the distance.

In the digital information analysis system according to the above-mentioned aspect, the relation determination unit may include an analysis unit that performs morphological analysis on the target digital information and a word order determination unit that determines the relation on the basis of the word order of the two component words forming the word combination which is obtained from the analysis result of the analysis unit.

In the digital information analysis system according to the above-mentioned aspect, the relation determination unit may include an analysis unit that performs morphological analysis on the target digital information and a sentence determination unit that determines the relation on the basis of information obtained from the analysis result of the analysis unit indicating whether one word and another word forming the word combination are present in the same sentence.

In the digital information analysis system according to the above-mentioned aspect, the predetermined specific item may be information indicating relation to a lawsuit.

As according to the above-mentioned aspect, the digital information analysis system may further include a correction unit that corrects the determination result of the relation determination unit in response to an instruction from the outside.

In order to achieve the above-mentioned objective, another aspect of the invention is the provision of a digital information analysis method including selecting target digital information to be investigated which is stored in an information processing apparatus, searching whether a plurality of word combinations related to a predetermined specific item, each of which is stored in a combination storage unit, are included in the target digital information selected in the selection of the target digital information, determining the relation of the target digital information to the predetermined specific item on the basis of a morphological analysis result when at least one of the plurality of word combinations stored in the combination storage unit is included in the target digital information, and associating a determination result in the determination of the relation with the target digital information.

In order to achieve the above-mentioned objective, yet another aspect of the invention includes the provision of a digital information analysis program causing a computer to implement a target selection function for selecting target digital information to be investigated which is stored in an information processing apparatus, a search function for searching whether a plurality of word combinations related to a predetermined specific item, each of which is stored in a combination storage unit, are included in the target digital information selected by the target selection function, a relation determination function for determining the relation of the target digital information to the predetermined specific item on the basis of a morphological analysis result when at least one of the plurality of word combinations stored in the combination storage unit is included in the target digital information, and a determination result setting function for associating the determination result of the relation determination function with the target digital information.

Based on the digital information analysis system, the digital information analysis method, and the digital information analysis program of the invention, it is possible to provide a digital information analysis system, a digital information analysis method, and a digital information analysis program that analyze digital information on the basis of relations between a plurality of words.

BRIEF DESCRIPTION OF THE DRAWINGS

FIG. 5 is a flowchart illustrating the process of the digital information analysis system according to the embodiment of the invention; and FIG. 6 is a diagram illustrating the hardware configuration of the digital information analysis system according to this embodiment.

DETAILED DESCRIPTION OF THE INVENTION

Embodiments

Figure 1:
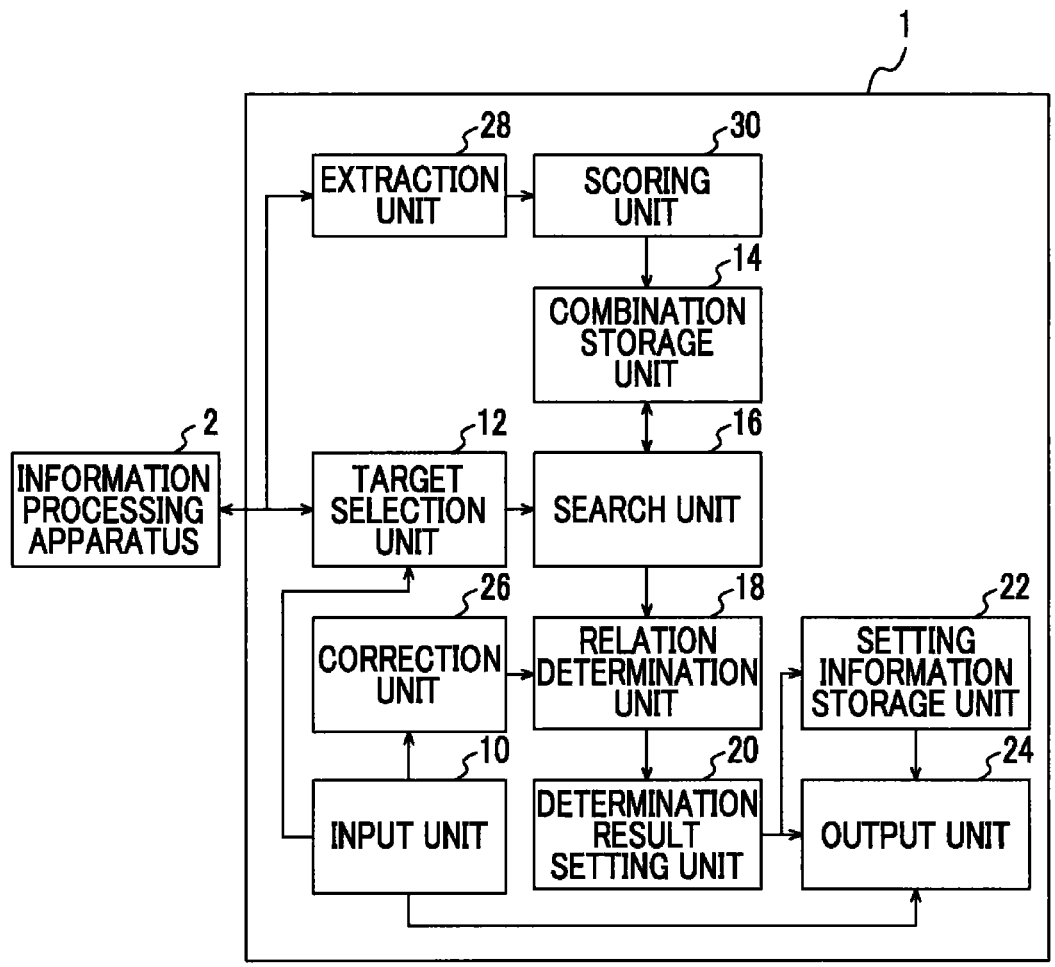
FIG. 1 is a functional block diagram illustrating the structure of a digital information analysis system according to an embodiment.

FIG. 1 shows an example of the functional structure block of a digital information analysis system according to an embodiment.

Outline of Digital Information Analysis System 1

The digital information analysis system 1 according to this embodiment automatically extracts digital information which is related to a predetermined specific item from a plurality of digital information stored in an information processing apparatus 2, such as a user terminal or a server. Here, the predetermined specific item is, for example, information indicating relation to a lawsuit. For example, the digital information analysis system 1 according to this embodiment can be applied to a forensic technique that, when there is a crime or a legal conflict involving computers, such as illegal access or the leakage of confidential information, collects digital information, which are electronic records required to find or investigate the causes of the crime or the legal conflict, analyzes the information, and substantiates legal evidence. The digital information analysis system 1 includes a combination storage unit 14 serving as a dictionary which stores a score indicating the degree of relation to the predetermined specific item so as to be associated with a plurality of word combinations related to the predetermined specific item. When an arbitrary file stored in an information processing apparatus 2 is selected, the digital information analysis system 1 analyzes sentences in the file on the basis of morphological analysis and determines whether the plurality of word combinations stored in the combination storage unit 14 are included in the selected file.

When determining that the word combinations stored in the combination storage unit 14 are included in the selected file, the digital information analysis system 1 determines the degree of relation of the file to the predetermined specific item on the basis of the distance between a plurality of words, the order of the plurality of words, and/or whether the plurality of words are included in the same sentence. Then, the digital information analysis system 1 associates information indicating the determination result (that is, information indicating the degree of relation to the predetermined specific item) with the selected file.

For example, when a plurality of words include two words, the distance between one word and the other word in the sentence is equal to or less than a predetermined distance, and a combination of the words has a predetermined significance, the digital information analysis system 1 determines that the relation of the selected file to the predetermined specific item is high. The digital information analysis system 1 compares the part of speech of one of the two words with the part of speech of the other word. When the parts of speech are arranged in a predetermined order in the sentence and the combination of the words has a predetermined significance, the digital information analysis system 1 determines that the relation of the selected file to the predetermined specific item is high. When the distance between the one word and the other word is equal to or less than the predetermined distance and the two words are included in the same sentence, the digital information analysis system 1 determines that the combination of the words has a predetermined significance and the relation of a file including the word combination to the predetermined specific item is higher than that when the two words are included in different sentences. Then, the digital information analysis system 1 associates information indicating the determination result with the selected file.

The digital information analysis system 1 performs the same process on a plurality of other files stored in the information processing apparatus 2. Then, the digital information analysis system 1 automatically extracts a file having a high relation to the predetermined specific item or a file having a low relation to the predetermined specific item from the information processing apparatus 2 in response to an instruction from the outside. Then, the digital information analysis system 1 outputs the extracted file to the user such that the user can recognize the file. Therefore, the digital information analysis system 1 can automatically extract a plurality of files related to predetermined specific information and output the extracted files.

In this embodiment, one or more servers are provided. This embodiment may include a plurality of servers. For example, the server includes a server which can store digital information, such as a mail server, a file server, or a document management server. One or more user terminals are provided. This embodiment may include a plurality of user terminals. For example, the user terminal includes a personal computer, a notebook personal computer, a tablet PC, or a portable communication terminal such as a mobile phone.

Details of Digital Information Analysis System 1

Figure 2:
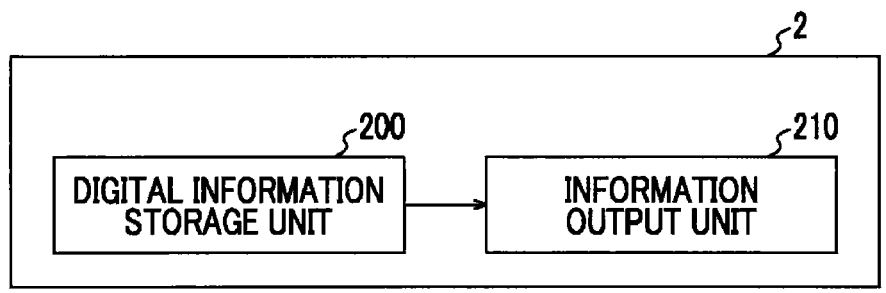
FIG. 2 is a functional block diagram illustrating the structure of an information processing apparatus.
Figures 3, 4:
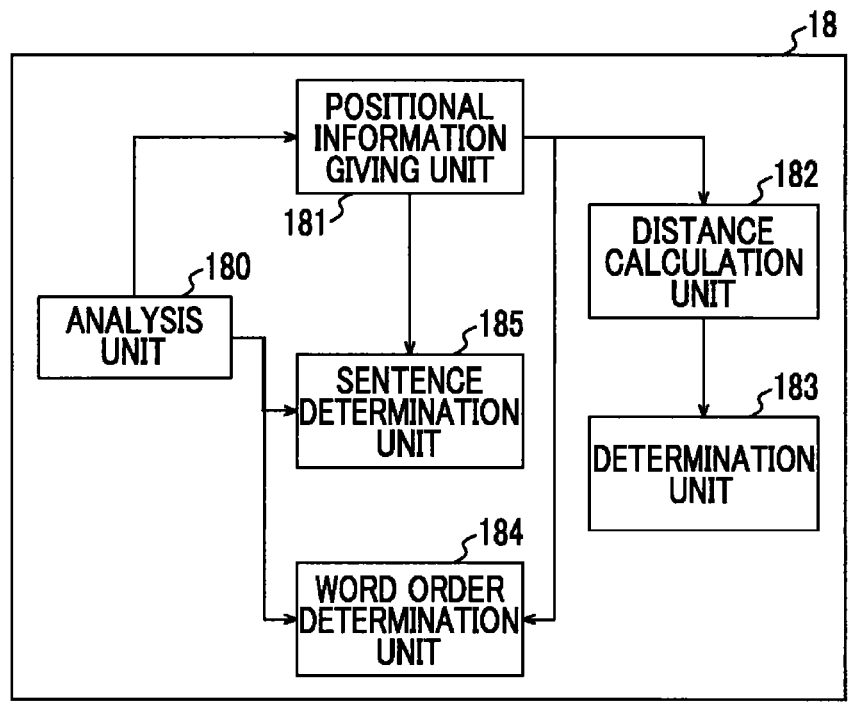
FIG. 3 is a functional block diagram illustrating the structure of a relation determination unit of the digital information analysis system according to this embodiment.
FIG. 4 is a diagram illustrating the data structure of a combination storage unit according to this embodiment.

FIG. 2 shows an example of the functional structure block of the information processing apparatus. FIG. 3 shows an example of the functional structure block of a relation determination unit of the digital information analysis system according to this embodiment. FIG. 4 shows an example of the data structure of the combination storage unit according to this embodiment.

The digital information analysis system 1 includes an input unit 10 that receives, from the outside, an instruction to select target digital information, which is digital information to be investigated, stored in the information processing apparatus 2, a target selection unit 12 that selects and acquires the target digital information from the information processing apparatus 2 in response to the instruction received by the input unit 10, and the combination storage unit 14 that stores each of the plurality of word combinations related to the predetermined specific item.

In addition, the digital information analysis system 1 includes a search unit 16 that searches whether the plurality of word combinations stored in the combination storage unit 14 are included in the target digital information selected by the target selection unit 12, a relation determination unit 18 that, when at least one of the plurality of word combinations stored in the combination storage unit 14 is included in the target digital information, determines the relation of the predetermined specific item to the target digital information on the basis of the morphological analysis result, and a determination result setting unit 20 that associates the determination result of the relation determination unit 18 with the target digital information.

The digital information analysis system 1 further includes a setting information storage unit 22 that stores information from the determination result setting unit 20, an output unit 24 that outputs the target digital information on the basis of the settings of the determination result setting unit 20 or setting information stored in the setting information storage unit 22, and a correction unit 26 that can correct the setting result of the determination result setting unit 20. The digital information analysis system 1 may further include an extraction unit 28 that extracts a plurality of word combinations included in each of a plurality of digital information and a scoring unit 30 that associates a score corresponding to the relation to the predetermined specific item with each of the plurality of word combinations extracted by the extraction unit 28.

Information Processing Apparatus 2

The information processing apparatus 2 includes a digital information storage unit 200 that stores a plurality of digital information and an information output unit 210 that outputs digital information to the outside. The digital information storage unit 200 stores a plurality of digital information, such as a document file, a text file, or electronic mail including sentence information. The digital information storage unit 200 supplies predetermined digital information to the information output unit 210 in response to the operation of the target selection unit 12 or the extraction unit 28. The information output unit 210 supplies the digital information stored in the digital information storage unit 200 to the target selection unit 12 or the extraction unit 28. The digital information analysis system 1 and the information processing apparatus 2 are connected by a communication network, such as the Internet, or a wired or wireless network, such as a LAN, such that they can communicate with each other. In addition, the digital information analysis system 1 may include some or all of the functions and structure of the information processing apparatus 2.

Input Unit 10

The input unit 10 receives, from the outside, an instruction to select the target digital information stored in the digital information storage unit 200 of the information processing apparatus 2. In addition, the input unit 10 may receive an instruction to correct the determination result of the determination result setting unit 20. The input unit 10 receives an instruction to output an electronic file related to predetermined specific information. The input unit 10 receives instructions from the user through, for example, a keyboard, a mouse, a touch panel, or a microphone. The input unit 10 supplies an instruction to select the received target digital information to the target selection unit 12. In addition, the input unit 10 supplies an instruction to correct the determination result to the correction unit 26.

Target Selection Unit 12

The target selection unit 12 selects the target digital information stored in the digital information storage unit 200 and acquires the selected target digital information from the digital information storage unit 200, in response to the instruction received from the input unit 10. The instruction received by the input unit 10 includes information for specifying the target digital information. For example, the target selection unit 12 receives, from the input unit 10, information which designates a file name for identifying the target digital information, a target digital information creation date and time, a target digital information update date and time, and the file size of the target digital information. Then, the target selection unit 12 selects and acquires target digital information corresponding to the designation information from the digital information storage unit 200. In addition, the target selection unit 12 may select a plurality of target digital information from the digital information storage unit 200 of the information processing apparatus 2. The target selection unit 12 supplies the acquired target digital information to the search unit 16.

Combination Storage Unit 14

The combination storage unit 14 stores a plurality of word combinations related to the predetermined specific item, or the predetermined specific item and a plurality of word combinations associated with a score corresponding to the relation to the predetermined specific item. The word is the smallest linguistic unit that has a grammatically specific meaning and function. A plurality of words are two or more words. The score is a value indicating the degree of relation of combinations of a plurality of words to the predetermined specific item. As the value increases, the degree of relation increases.

For example, the combination storage unit 14 stores the score which is to be associated with a combination of a first word and a second word. In the example shown in FIG. 4, the predetermined specific item is information related to "infringement". In this case, the combination storage unit 14 stores a score of "5" which is to be associated with the combination of "digital camera" as the first word and "infringement" as the second word. In addition, the combination storage unit 14 stores a score of "1" which is to be associated with the combination of "rapid pace" as the first word and "schedule" as the second word. In this case, the relation of the combination of the words "digital camera" and "infringement" to infringement is higher than the relation of the combination of the words "rapid pace" and "schedule" to infringement.

The combination storage unit 14 supplies word combinations corresponding to the operation of the search unit 16 to the search unit 16 in response to the operation of the search unit 16. In addition, the combination storage unit 14 receives the word combinations and the scores of the word combinations supplied from the scoring unit 30 and stores them.

Search Unit 16

The search unit 16 searches whether a plurality of word combinations stored in the combination storage unit 14 are included in the target digital information selected by the target selection unit 12. Specifically, the search unit 16 searches whether each word forming the plurality of word combinations stored in the combination storage unit 14 is included in an electronic file as the target digital information. For example, when a word combination is formed by a first word and a second word, the search unit 16 searches whether both the first word and the second word are included in the electronic file.

When at least one word combination among the plurality of word combinations stored in the combination storage unit 14 is included in the electronic file, the search unit 16 supplies the electronic file including the word combination to the relation determination unit 18. In addition, even when none of the plurality of word combinations stored in the combination storage unit 14 is included in the electronic file, the search unit 16 can supply the electronic file to the relation determination unit 18.

When a plurality of target digital information are received from the target selection unit 12, the search unit 16 may search whether a plurality of word combinations are included in each of the plurality of target digital information. When the target digital information is electronic mail, the search unit 16 may search whether a plurality of word combinations are included in the information except for the header information of the electronic mail. Therefore, the digital information analysis system 1 can exclude information which is not substantially related to the predetermined specific item (that is, information which will be noise). In addition, the search unit 16 may search for word combinations included in the target digital information, on the basis of word combinations corresponding to the scores which are stored in the combination storage unit 14 and are equal to or greater than a predetermined value.

Relation Determination Unit 18

The relation determination unit 18 analyzes at least one word combination or each of the plurality of word combinations included in the electronic file which is received from the search unit 16. Then, the relation determination unit 18 determines the relation of the electronic file to a predetermined specific item, that is, whether the electronic file is related to the predetermined specific item, on the basis of morphological analysis. Then, the relation determination unit 18 supplies information indicating the determination result to the determination result setting unit 20.

Specifically, the relation determination unit 18 includes an analysis unit 180 that performs morphological analysis on target digital information, a positional information giving unit 181 that gives positional information in the sentence indicated by the target digital information to one word and another word forming a word combination on the basis of the analysis result of the analysis unit 180, and a distance calculation unit 182 that calculates the distance between the positional information of the one word and the positional information of another word in the sentence, which are given by the positional information giving unit 181, and a determination unit 183 that determines the relation on the basis of the distance calculated by the distance calculation unit 182.

Specifically, the analysis unit 180 includes an aggregate of grammar rules used for morphological analysis and a dictionary for analysis which includes, for example, a word list including information about parts of speech. Then, the analysis unit 180 analyzes the sentences included in the electronic file as the target digital information using the dictionary for analysis and divides each sentence into morphemes. The analysis unit 180 supplies information indicating the analysis result and the electronic file to the positional information giving unit 181, a word order determination unit 184, and a sentence determination unit 185. The analysis unit 180 can include dictionaries for analysis which correspond to many languages such as Japanese and English.

Then, the positional information giving unit 181 gives the positional information of each morpheme divided by the analysis unit 180 to each morpheme in the sentence. For example, when the analysis unit 180 divides one sentence into a first morpheme m and a second morpheme n, the positional information giving unit 181 gives $P_m$ as positional information to the first morpheme m and gives $P_n$ as positional information to the second morpheme n. The positional information giving unit 181 supplies information indicating each of a plurality of morphemes, which are given the positional information, to the distance calculation unit 182, the word order determination unit 184, and the sentence determination unit 185.

The distance calculation unit 182 calculates the distance between the morphemes in the sentence on the basis of the information indicating the morphemes to which the positional information are given. The distance calculation unit 182 calculates the distance by calculating the difference between the positional information given to the morphemes. For example, the distance calculation unit 182 calculates, as a distance $d_{mn}$, the absolute value of the difference between the positional information $P_m$ of the first morpheme and the positional information $P_n$ of the second morpheme. That is, the distance calculation unit 182 calculates the distance using the following expression: $d_{mn}=|P_m-P_n|$. The distance calculation unit 182 calculates the distance for each of a plurality of word combinations in the electronic file and supplies a plurality of information indicating the calculated distances to the determination unit 183.

When the electronic file includes a plurality of combinations of the same words, the determination unit 183 selects, as co-occurring morphemes, the word combination having the shortest distance among a plurality of distances received from the distance calculation unit 182. Then, the determination unit 183 calculates the difference between the frequency of appearance of the morpheme and the expected value of the frequency of appearance and evaluates the significance of the selected word combination on the basis of the difference. Specifically, the determination unit 183 calculates an evaluation value on the basis of the following expression:

$$T_{m,n} = \frac{CTF_{m,n} - E(CTF_{m,n})}{\sqrt{CTF_{m,n}}} = \frac{CTF_{m,n} - TF_m \cdot TF_n / N_V}{\sqrt{CTF_{m,n}}} \quad \text{[Expression 1]}$$

where $T_{m,n}$ is a T score which is the evaluation value of the co-occurring morpheme, $CTF_{m,n}$ is the frequency of appearance of the co-occurring morpheme in the electronic file, $E(CTF_{m,n})$ is the expected value of $CTF_{m,n}$, $TF_{m(n)}$ is the frequency of appearance of the morpheme, and $N_v$ is the total number of gerunds in the electronic file.

Then, the determination unit 183 determines the degree of relation to the predetermined specific item for each of a plurality of electronic files. That is, the determination unit 183 determines whether the electronic file is related to the predetermined specific item, the electronic file is likely to be related to the predetermined specific item, or the electronic file is unlikely to be related to the predetermined specific item, on the basis of the evaluation value obtained by the above-mentioned expression.

For example, when the evaluation value is equal to or greater than a predetermined value, the determination unit 183 determines that the significance of a word combination selected as the co-occurring morpheme is high. For example, when $T_{mn}$ is equal to or greater than "2", the determination unit 183 determines that the significance is high. Then, the determination unit 183 determines that the electronic file including the word combination which is determined to have high significance is related to the predetermined specific item. Then, the determination unit 183 supplies information indicating the determination result to the determination result setting unit 20.

Similarly, when the evaluation value is within the range of the predetermined value, the determination unit 183 determines that the word combination selected as the morpheme collocation has a medium significance. Then, the determination unit 183 determines that the electronic file including the word combination which is determined to have medium significance is likely to be related to the predetermined specific item. When the evaluation value is less than the predetermined value, the determination unit 183 determines that the significance of the word combination selected as the morpheme collocation is low. Then, the determination unit 183 determines that the electronic file including the word combination which is determined to have low significance is unlikely to be related to the predetermined specific item.

The determination unit 183 may compare a plurality of distances corresponding to each of a plurality of word combinations and rank a plurality of words according to the distance. For example, the determination unit 183 can select a word combination having the shortest distance between them as the morpheme collocation. In addition, the determination unit 183 may compare the distance received from the distance calculation unit 182 with a predetermined threshold value for the distance and select, as the morpheme collocation, a word combination corresponding to the distance that is equal to or less than the threshold value or is greater than the threshold value. For example, the determination unit 183 can select, as the morpheme collocation, a word combination corresponding to the distance that is equal to or less than the threshold value.

The relation determination unit 18 includes the word order determination unit 184 that determines the relation on the basis of the order of one word and another word forming a plurality of word combinations obtained from the morphological analysis result of the analysis unit 180 and/or the order of the part of speech of the one word and the part of speech of another word. For example, the word order determination unit 184 determines whether each of a plurality of words is a common noun or a Sahen-noun (the Sahen-noun is a Japanese-specific noun that functions as a verb if it is followed by word "suru", which means "to do" in English), and determines the positional relationship between a common noun $G_n$ and a verb "suru" $V_n$ obtained from the determination result. For example, a case will be described in which each of a plurality of word combinations includes two words, of which one word is a common noun and the other word is the verb "suru".

In this case, the word order determination unit 184 compares the position $P_{Vn}$ of the common noun and the position $P_{Gn}$ of the verb "suru" in a sentence for each of a plurality of word combinations. When the position $P_{Vn}$ of the common noun is behind the position $P_{Gn}$ of the verb "suru" in the sentence (that is, $P_{Vn} > P_{Gn}$), the word order determination unit 184 selects, as the co-occurring morphemes, a word combination in which the position $P_{Vn}$ of the common noun is behind the position $P_{Gn}$ of the verb "suru", rather than when the common noun is positioned before the verb "suru" in the sentence (that is, $P_{Vn} < P_{Gn}$). Therefore, the relation determination unit 18 can select a word combination as the morpheme collocation in which the two collocates function as a subject and a verb or, alternatively, an object and a verb.

In addition, the relation determination unit 18 includes a sentence determination unit 185 that determines the relation on the basis of information indicating whether each of the words forming the word combination, which is obtained from the morphological analysis result of the analysis unit 180, are present in the same sentence. First, the sentence determination unit 185 detects a sentence unit (that is, a delimiter) from the sentences included in the electronic file and uses this to divide the text into a plurality of sentences. For example, the sentence determination unit 185 has an entire sentence search function (for example, a function implemented by lucene-gosen (hereinafter, referred to as a "lucene-gosen function")). The sentence determination unit 185 divides the text included in the electronic file into a plurality of sentences using a head flag of the lucene-gosen function.

Then, the sentence determination unit 185 determines whether each word forming a word combination is present in the same sentence. Then, the sentence determination unit 185 selects a word combination which is present in the same sentence as co-occurring morpheme collocation. The lucene-gosen function of the sentence determination unit 185 can use a period or a comma as the head flag.

Determination Result Setting Unit 20

The determination result setting unit 20 associates the determination result of the relation determination unit 18 with the electronic file. The determination result setting unit 20 can associate the determination result with each of a plurality of electronic files. For example, the determination result setting unit 20 gives a tag indicating "Hot" to the electronic file when receiving the determination result of the relation determination unit 18 that the electronic file is related to the predetermined specific item, gives a tag indicating "Responsive" to the electronic file when receiving the determination result that the electronic file is likely to be related to the predetermined specific item, and gives a tag indicating "Not Responsive" to the electronic file when receiving the determination result that the electronic file is unlikely to be related to the predetermined specific item. The determination result setting unit 20 supplies the electronic file which is given the tag indicating the determination result to the setting information storage unit 22 and/or the output unit 24.

Setting Information Storage Unit 22

The setting information storage unit 22 stores a tag indicating the determination result of the determination result setting unit 20 which is associated with the electronic file so as to be associated with an electronic file identifier for uniquely identifying the electronic file. The setting information storage unit 22 supplies the tag associated with the electronic file identifier to the output unit 24. The setting information storage unit 22 may store the electronic file so as to be associated with the electronic file identifier.

Output Unit 24

The output unit 24 outputs the target digital information related to the predetermined specific information on the basis of the determination result which is associated with each of the electronic files as a plurality of target digital information by the determination result setting unit 20. For example, the output unit 24 outputs the electronic file related to the predetermined specific information to the user in response to an instruction from the outside such that the user can recognize the electronic file. In addition, the output unit 24 may output the tag associated with the electronic file identifier stored in the setting information storage unit 22. When the input unit 10 receives an instruction from the outside to output the electronic file related to the predetermined specific information, the output unit 24 outputs a plurality of electronic files associated with a tag indicating the relation of the electronic file to the specific information.

The output unit 24 is a display device, such as a display that can display digital information, and/or an output device, such as a printer that outputs digital information to a predetermined medium. The output unit 24 may output information by recording the information to be output on a recording medium, such as a magnetic recording medium or an optical recording medium.

Correction Unit 26

The correction unit 26 corrects the determination result of the relation determination unit 18 on the basis of information indicating a correction instruction which is received from the outside by the input unit 10. The relation determination unit 18 supplies information indicating the determination result corrected by the correction unit 26 to the determination result setting unit 20.

Extraction Unit 28

The extraction unit 28 extracts a plurality of word combinations included in each of a plurality of digital information as a plurality of sample files. The extraction unit 28 supplies the extracted plurality of word combinations to the scoring unit 30. An example of a sample file is an electronic file which is predetermined to have a high relation to a specific item (for example, a specific lawsuit) depending on a specific event. Another example of a sample file is an electronic file which is predetermined to have a high relation to a specific item (for example, a general intellectual property infringement lawsuit) which does not depend on a specific event.

Scoring unit 30

The scoring unit 30 associates a score corresponding to the relation to a predetermined specific item with each of the plurality of word combinations extracted by the extraction unit 28. For example, when the predetermined specific item is a "lawsuit", the scoring unit 30 associates a score with the electronic file on the basis of the frequency of appearance of a word combination having a high relation to the "lawsuit" in the electronic file. The scoring unit 30 supplies and stores the word combination associated with the score in the combination storage unit 14.

Outline of Digital Information Analysis Method

FIG. 5 shows an example of the flow of the process of the digital information analysis system according to the embodiment of the invention.

First, the target selection unit 12 selects and acquires target digital information corresponding to an instruction input from the input unit 10 from a plurality of target digital information stored in the information processing apparatus 2 (Step 10; hereinafter, the step is represented by "S"). The target selection unit 12 supplies the acquired target digital information to the search unit 16. The search unit 16 searches whether word combinations stored in the combination storage unit 14 are present in the sentence included in the target digital information received from the target selection unit 12 (S15). The search unit 16 supplies the search result to the relation determination unit 18.

The relation determination unit 18 receives the search result of the search unit 16 from the search unit 16 and analyzes at least one word combination included in the target digital information. Then, the relation determination unit 18 determines the degree of relation between the target digital information and the predetermined specific item (S20). The relation determination unit 18 supplies information indicating the determination result to the determination result setting unit 20. The determination result setting unit 20 associates the determination result as a tag indicating the determination result of the relation determination unit 18 with the target digital information (S25). The determination result setting unit 20 supplies, to the output unit 24, the target digital information having the tag associated therewith or an identifier for identifying the target digital information having the tag associated therewith. The output unit 24 outputs the target digital information having a predetermined tag associated therewith to the outside, in response to an operation from the outside (S30).

FIG. 6 shows an example of the hardware configuration of the digital information analysis system according to the embodiment of the invention.

The digital information analysis system 1 according to this embodiment includes a CPU 1500, a graphic controller 1520, a memory 1530, such as a random access memory (RAM), a read-only memory (ROM), and/or a flash ROM, a storage device 1540 that stores data, a reading/writing device 1545 that reads data from a recording medium and/or writes data to the recording medium, an input device 1560 that inputs data, a communication interface 1550 that transmits and receives data to and from an external communication device, and a chipset 1510 that connects the CPU 1500, the graphic controller 1520, the memory 1530, the storage device 1540, the reading/writing device 1545, the input device 1560, and the communication interface 1550 such that they can communicate with each other.

The chipset 1510 connects the memory 1530, the CPU 1500 that accesses the memory 1530 and performs a predetermined process, and the graphic controller 1520 that controls the display of an external display device to perform data exchange between the components. The CPU 1500 operates on the basis of a program stored in the memory 1530 and controls each component. The graphic controller 1520 displays an image on a predetermined display device on the basis of image data which is temporarily stored in a buffer provided in the memory 1530.

The chipset 1510 connects the storage device 1540, the reading/writing device 1545, and the communication interface 1550. The storage device 1540 stores programs and data used by the CPU 1500 of the digital information analysis system 1. The storage device 1540 is, for example, a flash memory. The reading/writing device 1545 reads a program and/or data from a recording medium which stores the program and/or data and stores the read program and/or data in the storage device 1540. For example, the reading/writing device 1545 acquires a predetermined program from a server on the Internet through the communication interface 1550 and stores the acquired program in the storage device 1540.

The communication interface 1550 transmits and receives data to and from an external device through a communication network. In addition, when the communication network is not available, the communication interface 1550 may transmit and receive data to and from the external device, without passing through the communication network. The input device 1560, such as a keyboard, a tablet, or a mouse, is connected to the chipset 1510 through a predetermined interface.

A digital information analysis program for the digital information analysis system 1 which is stored in the storage device 1540 is provided to the storage device 1540 through a communication network, such as the Internet, or a recording medium, such as a magnetic recording medium or an optical recording medium. Then, the CPU 1500 executes the program for the digital information analysis system 1 which is stored in the storage device 1540.

The digital information analysis program is executed by the CPU 1500 of the digital information analysis system 1 according to this embodiment to cause the digital information analysis system 1 to function as the input unit 10, the target selection unit 12, the combination storage unit 14, the search unit 16, the relation determination unit 18, the determination result setting unit 20, the setting information storage unit 22, the output unit 24, the correction unit 26, the extraction unit 28, the scoring unit 30, the analysis unit 180, the positional information giving unit 181, the distance calculation unit 182, the determination unit 183, the word order determination unit 184, and the sentence determination unit 185 which are described with reference to FIGS. 1 to 5.

Effect of Embodiment

According to this embodiment, the digital information analysis system 1 can select a morpheme collocation included in an electronic file as target digital information, on the basis of the distance between one word and the other word included in the electronic file, the order of the words, and whether the words are present in the same sentence, in addition to a combination of the two words having a high relation to a predetermined specific item. Then, the digital information analysis system 1 can easily select an electronic file related to the predetermined specific item from a plurality of electronic files stored in the information processing apparatus 2, using the selected word combination. Therefore, the digital information analysis system 1 can automatically extract a plurality of electronic files related to a predetermined specific item with high accuracy.

The embodiment of the invention has been described above. However, the above-described embodiment does not limit the invention described in the claims. In addition, it is noted that all combinations of characteristics described in the embodiment are not essential means for solving the problems of the invention. In addition, a technical element of the above-described embodiment may be individually applied. Alternatively, it may be divided into a plurality of parts, such as a program part and a hardware part and the plurality of parts may be applied.

What is claimed is:

1. A digital information analysis system, comprising:
    at least one hardware processor in electrical communication with at least one storage device, the storage device storing a digital information analysis program that is executed by the at least one hardware processor, the digital information analysis program comprising:
    a target selection unit that selects target digital information to be investigated which is stored in an information processing apparatus;
    a combination storage unit that stores each of a plurality of word combinations related to a predetermined specific item, each of the word combinations consisting of one word having a word class and another word having another word class;
    a search unit that searches whether the plurality of word combinations stored in the combination storage unit are included in the target digital information selected by the target selection unit;
    a determination unit that in a case where an order between the one word and the other word in each of the plurality of word combinations included in a sentence is a predetermined order, evaluates a state of the each of the word combinations that comes out in the sentence based on a frequency in which the each of the word combinations whose order of word classes between the one word and the other word is the predetermined order comes out in the target digital information;
    a relation determination unit that determines a relation of the target digital information to the predetermined specific item on the basis of the frequency, the relation determination unit including:
        an analysis unit that performs morphological analysis on the target digital information,
        a positional information giving unit that gives positional information in a sentence indicated by the target digital information to each of the two words forming the word combination, on the basis of an analysis result of the analysis unit;
        a distance calculation unit that calculates a distance between the positional information of the one word and the positional information of the other word which are given by the positional information giving unit, and
        a distance relation determination unit that determines the relation on the basis of the distance; and
    a determination result setting unit that associates a determination result of the relation determination unit with the target digital information.

2. The digital information analysis system according to claim 1, wherein the digital information analysis program further comprises:
    an output unit that outputs the target digital information related to the predetermined specific information, on the basis of the determination result which is associated with each of a plurality of target digital information by the determination result setting unit.

3. The digital information analysis system according to claim 2, wherein:
    the target selection unit selects a plurality of target digital information from the information processing apparatus,
    the search unit searches whether the plurality of word combinations are included in each of the plurality of target digital information,
    the relation determination unit determines the relation for each of the plurality of word combinations, and
    the determination result setting unit associates the determination result with each of the plurality of target digital information.

4. The digital information analysis system according to claim 1, wherein the relation determination unit of the digital information analysis program includes:

an analysis unit that performs morphological analysis on the target digital information; and a word order determination unit that determines the relation on the basis of the word order of the two words forming the word combination which is obtained from an analysis result of the analysis unit.

5. The digital information analysis system according to claim 1, wherein the relation determination unit of the digital information analysis program includes:

an analysis unit that performs morphological analysis on the target digital information; and a sentence determination unit that determines the relation on the basis of information indicating whether both words forming the word combination, which is obtained from an analysis result of the analysis unit, are present in the same sentence.

6. The digital information analysis system according to claim 1, wherein the predetermined specific item is information indicating relation to a lawsuit.

7. The digital information analysis system according to claim 1, wherein the digital information analysis program further comprises:

a correction unit that corrects the determination result of the relation determination unit in response to an instruction from the outside.

8. An information analysis method performed in a digital information analysis computer system including at least one hardware processor in electrical communication with at least one storage device, the storage device storing a digital information analysis program comprising a target selection unit, a combination storage unit, a search unit, a determination unit, a relation determination unit, an analysis unit, a positional information giving unit, a distance calculation unit, a distance relation determination unit, and a determination result setting unit, the method comprising:

selecting target digital information to be investigated in the target selection unit;

searching whether a plurality of word combinations related to a predetermined specific item in the search unit, each of which is stored in the combination storage unit, are included in the target digital information selected in the selection of the target digital information, each of the word combinations consisting of one word having a word class and another word having another word class;

evaluating, in a case where an order of word classes between the one word and the other word in each of the plurality of word combinations included in a sentence is a predetermined order in the determination unit, a state of the each of the word combinations that comes out in the sentence based on a frequency in which each of the word combinations whose order of word classes between the one word and the other word is the predetermined order comes out in the target digital information;

determining relation of the target digital information to the predetermined specific item on the basis of the frequency in the relation determination unit by:

performing morphological analysis on the target digital information in the analysis unit;

giving positional information in a sentence indicated by the target digital information to each of the two words forming the word combination in the positional information giving unit, on the basis of an analysis result of the analysis unit;

calculating a distance between the positional information of the one word and the positional information of the other word which are given by the positional information giving unit in the distance calculation unit; and determining the relation on the basis of the distance in the distance relation determination unit; and associating a determination result in the determination of the relation with the target digital information in the determination result setting unit, wherein the digital information analysis program is executed by the at least one hardware processor.

* * * * *